C. A. & C. P. JESKE.
SPEED RECORDER FOR VEHICLES.
APPLICATION FILED NOV. 17, 1915.
1,242,557.
Patented Oct. 9, 1917.
3 SHEETS—SHEET 1.
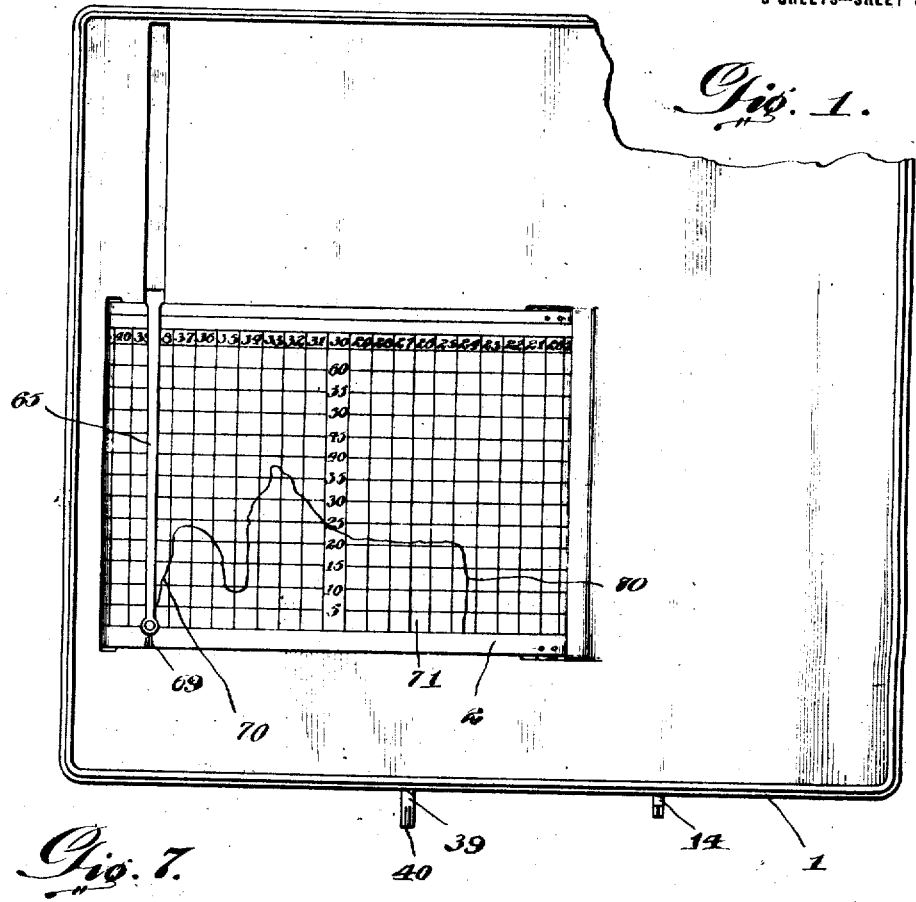
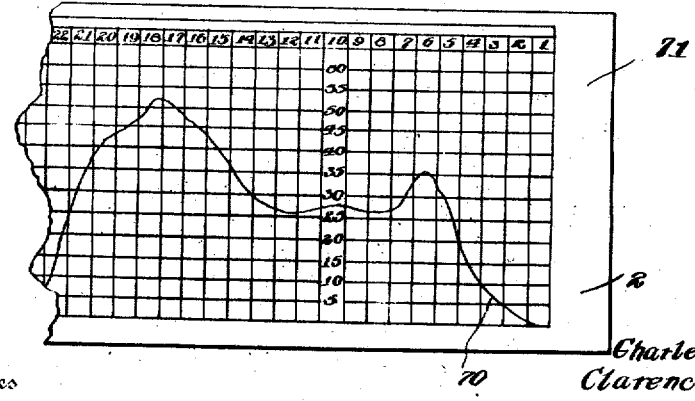
Witnesses
Frederick L. Fox.
P. M. Smith.
Inventor
Charles A. Jeske.
Clarence P. Jeske.
By Victor J. Evans.
Attorney

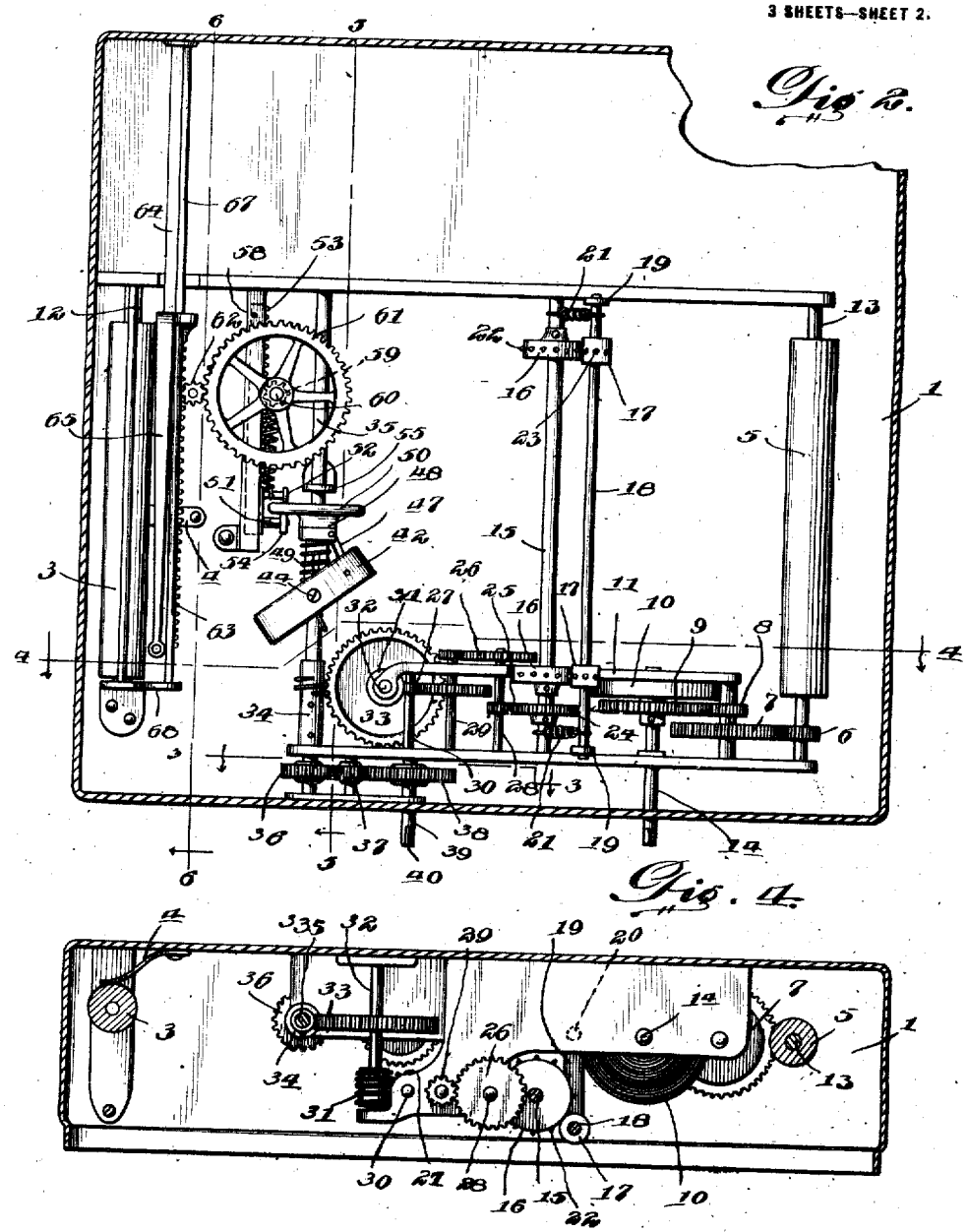

C. A. & C. P. JESKE.
SPEED RECORDER FOR VEHICLES.
APPLICATION FILED NOV. 17, 1915.
1,242,557.
Patented Oct. 9, 1917.
3 SHEETS—SHEET 3.
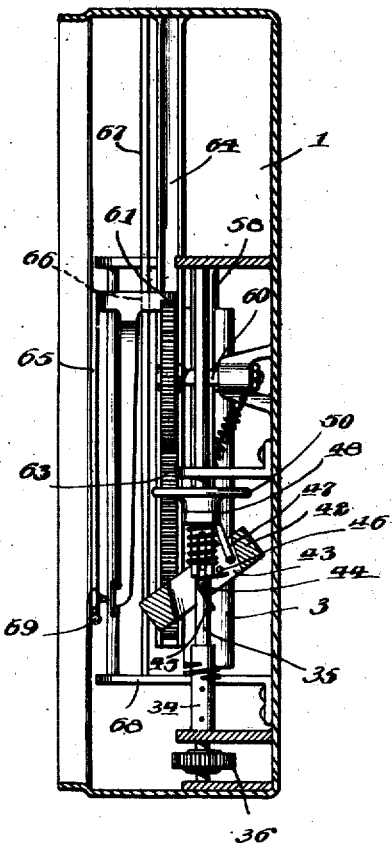
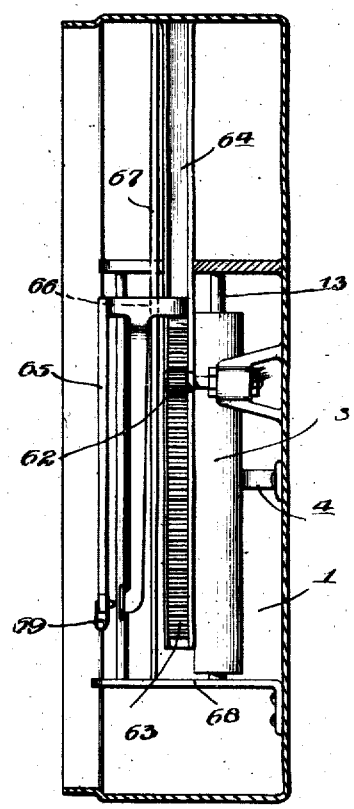
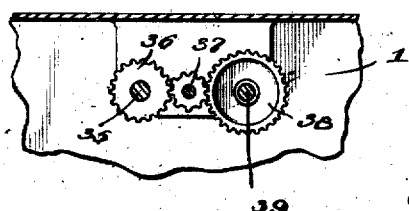
Inventors
Charles A. Jeske.
Clarence P. Jeske.
Witnesses
Frederick L. Fox.
P. M. Smith.
By Victor J. Evans.
Attorney

UNITED STATES PATENT OFFICE.

CHARLES A. JESKE AND CLARENCE P. JESKE, OF CHICAGO, ILLINOIS.

SPEED-RECORDER FOR VEHICLES.

1,242,557.     Specification of Letters Patent.     Patented Oct. 9, 1917.

Application filed November 17, 1915. Serial No. 61,980.

*To all whom it may concern:*

Be it known that we, CHARLES A. JESKE and CLARENCE P. JESKE, citizens of the United States, residing at Chicago, in the county of Cook and State of Illinois, have invented new and useful Improvements in Speed-Recorders for Vehicles, of which the following is a specification.

This invention relates to speed recorders for vehicles and while the device hereinafter particularly described is especially designed for use on automobiles, it will be understood as the description proceeds that the recording device may also be used on all kinds of vehicles such as locomotives, street cars, elevated trains, motor cycles and wagons. Furthermore, the recorder may be constructed to make a complete record of speed and mileage up to the rate of one hundred miles per hour or five thousand or more miles in extent after which a new record sheet may be substituted for the one completed and the old record sheets may be filed away for future use and may be inspected at any time so that they may be reviewed with interest.

Another object of the invention is to provide governor controlled means for actuating a traveling record sheet at a speed or velocity in proportion to the speed of the vehicle in conjunction with which the recorder is used; also a marker for said traveling record sheet which is also actuated and controlled in its movements by the governor mechanism.

The device as a whole will make a positive record of any and all speeds at which the car or vehicle is traveling so that the record may be used in court either to convict or acquit the party driving the machine. The device will also have a strong tendency to eliminate excessive speeding for the reason that the record may easily be inspected by an officer of the law. In case of a wreck, collision or accident of any kind, the speed record at the moment of the accident may be easily and definitely ascertained.

With the above and other objects in view, the invention consists in the novel construction, combination and arrangement of parts, as herein described, illustrated and claimed.

In the accompanying drawings:—

Figure 1 is a front elevation of a recorder, showing the traveling record sheet and the marker.

Fig. 2 is a similar view with the record sheet broken away to show the internal mechanism.

Fig. 3 is a horizontal section on the line 3—3 of Fig. 2 taken just above the initial driving gears.

Fig. 4 is a similar view taken on the line 4—4 of Fig. 2 just above the train of feeder gears and the spring tensioned train of gears which actuate the take-up roller of the record sheet.

Fig. 5 is a vertical section on the line 5—5 of Fig. 2 taken about in line with the governor shaft.

Fig. 6 is a vertical cross section on the line 6—6 of Fig. 2 taken adjacent to the marker arm and its rack bar.

Fig. 7 is a fragmentary view of the record sheet.

In the present and preferred embodiment of this invention, I employ a box-like casing or housing 1 of any desired length and width according to the dimensions of the record sheet which is indicated at 2. The record sheet is preferably made of considerable length and will ordinarily be composed of paper, said record sheet being primarily wound upon an initial or delivery roller 3 held against free rotation by means of a tension spring 4 which enables the record sheet to be gradually unwound therefrom but serves to keep the record sheet stretched or under slight tension. The record sheet after traveling lengthwise of the casing is secured to and wound upon a take up roller 5 which is placed under spring tension by means of a train of gears 6, 7, 8 and 9, the shaft of the last named gear having associated therewith a convolute spring 10 similar to an ordinary clock spring and having one end thereof suitably anchored to an internally arranged frame bar 11. The shafts 12 and 13 of the delivery and take-up rollers are journaled in bearings in the casing 1 and the shaft of the gear 9 is also journaled in suitable bearings within the casing; also the shaft which carries the gears 7 and 8, the gear 6 which is shown in the form of a pinion being fast on the shaft of the take-up roller. The shaft 14 of the gear 9 forms the spring winding shaft of the tensioning mechanism for the take-up roller and preferably extends through and projects beyond the adjacent wall of the casing so that a suitable key may be associated therewith for the purpose of winding up the tensioning spring above described.

The mechanism for feeding the record sheet from the delivery roller to the take-up roller and regulating the velocity at which said record sheet travels comprises a feed shaft 15 journaled in bearings in the casing and having fast thereon feeding rollers 16 in conjunction with which work other feeding rollers 17 fast on a counter-feed shaft 18, the last named shaft being journaled in swinging hangers or links 19 which are pivotally mounted in the casing at 20 thereby enabling the rollers or wheels 17 to move toward and away from the rollers or wheels 16. The rollers 17 are yieldingly held toward the wheels or rollers 16 and in contact with the record sheet by means of contractile springs 21 which are shown as having their ends bent to embrace the shafts 15 and 18. The wheels or rollers 16 are preferably provided with barbs or pointed projections 22 while the wheels or rollers 17 are preferably formed of rubber and have indentations 23 to receive the barbs 22, thereby enabling two sets of feeding wheels or rollers to obtain a firm grip and positive hold on the traveling record sheet adjacent to the longitudinal or side margins thereof.

The means for driving the feeding shaft 15 consists of a train of gears 24, 25, 26 and 27, the first named gear 24 being fast on the feeding shaft and the other gears being respectively mounted on shafts 28, 29 and 30 journaled within the casing. The last of the above named train of gears is in the form of a pinion which meshes with and is actuated by a worm 31 on a transversely extending shaft 32 which also has fast thereon a large worm wheel 33 which in turn meshes with and is actuated by a worm 34 on a governor shaft 35 which is parallel to the shafts of the rollers carrying the record sheet. The governor shaft 35 has fast thereon a gear 36 which meshes with an idler pinion 37 in turn meshing with a gear 38 on the driving shaft 39 the end of which projects through the adjacent wall of the casing and is shown as having one or more projections or keys 40 so that a flexible driving shaft may be readily attached thereto. This flexible driving shaft may be actuated from one of the wheels or axles of the vehicle on which the recorder is mounted and of course the speed of the shaft 39 will therefore vary in accordance with the speed of the vehicle and consequently the speed of the governor shaft 35 will be correspondingly increased or diminished.

Pivotally mounted on the governor shaft and rotating therewith is a governor weight 42, said weight being shown as formed with a diametrically extending slot or aperture 43 across which extends the pivot 44 which connects with the governor shaft and permits the weight to tilt. The weight 42 is normally tilted as shown in the drawings by means of a spring 45 one portion of which bears against the governor and another portion against a stop 46 shown in the form of a pin extending transversely across the slot 43. A pivotal link 47 connects one side of the governor weight 42 with a sliding collar 48 movable longitudinally of the governor shaft and normally pressed in one direction by means of a coiled spring 49 which encircles the collar 48 and serves to press said collar away from the pivot 44. The collar 48 is formed with a broad circumferential flange 50, the peripheral portion of which works between projections 51 and 52 on a rack bar 53, one of said projections 51 having a flanged anti-friction roller 54 journaled thereon and bearing directly against the flange 50. 55 designates a bearing post which is held stationary by having one end thereof attached to the casing and another portion thereof held by a cross brace 57 within the casing 1.

The rack bar 53 moves longitudinally of a hollow or tubular guide 58 mounted in a fixed position within the casing and said rack bar engages a pinion 59 fast on a cross shaft 60, said shaft having also fast thereon a large gear 61 which meshes with a pinion 62, the latter meshing with and actuating a second rack bar 63 parallel to the first named rack bar 53 and movable in a tubular guide 64. Extending from one end of the rack bar 63 is an L-shaped marker arm 65 having a portion thereof formed with a guide opening 66 through which passes a guide 67 shown in the form of a rod having one end fastened directly to the casing 1 and the other end thereof supported by a bracket 68, the said bracket being shaped to admit of the full range of movement of the marker arm. At its extremity, the marker arm which lies close to the surface of the record sheet, is provided with a spring finger 69 adapted to carry a pen or pencil which is thus yieldingly held against the surface of the record sheet. While the record sheet is traveling in its predetermined direction and propelled by the actuating mechanism hereinabove described, the marker is shifted in accordance with the speed of the vehicle in a direction transversely of the record sheet. This record sheet as illustrated in Fig. 7 is ruled by cross lines into squares and numbered lengthwise to indicate miles and crosswise to indicate miles per hour.

From the foregoing description, taken in connection with the accompanying drawings, it will now be seen that the speed of the driving shaft of the recorder varies in accordance with the speed at which the vehicle is traveling and by reason of the fact that said driving shaft is geared to the feeding shaft for the record sheet, the latter is actuated at a varying and proportionate speed. Likewise the speed of the governor shaft varies for the same reason and in accordance with the same conditions and the governor mechanism operates through the connections described to correspondingly shift the marker across the face of the record sheet thus producing the irregular line indicated at 70 on the record sheet 71 as shown in Fig. 7. In this way a complete permanent record is kept of the speed at which the vehicle is traveling at any and all times as well as the distance between stops and points of interest along the route and, as previously noted, in case of an accident or sudden stoppage of the vehicle from any cause whatever, the recording mechanism will simultaneously stop with the terminal end of the marked line 70 showing exactly the speed at which the vehicle was traveling when the accident, collision or the like occurred.

It will, of course, be understood that the dimensions of the casing and the record sheet may be varied to suit the manufacturer and that various other changes may be made in the form, proportion and minor details of construction without departing from the principle or sacrificing any of the advantages of the invention.

Having thus described our invention, we claim:—

1. In a speed recorder for vehicles, a traveling record sheet, means for imparting motion to said sheet at a velocity proportionate to the speed of the vehicle, a rack bar movable in a path at a right angle to the path of movement of said record sheet, a marker arm parallel to said rack bar and carried thereby, a gear meshing with and actuating said rack bar, a second rack bar having a driving connection with said gear, and speed-controlled governor mechanism for shifting said second rack bar according to the speed of the governor shaft.

2. In a speed recorder for vehicles, a traveling record sheet, means for imparting motion to said sheet at a velocity proportionate to the speed of the vehicle, a rack bar movable in a path at a right angle to the path of movement of said record sheet, a marker arm parallel to said rack bar and carried thereby, a gear meshing with and actuating said rack bar, a second rack bar having a driving connection with said gear, speed-controlled governor mechanism for shifting said second rack bar according to the speed of the governor shaft, a cross bar connecting said marker arm and first named rack bar at one end only, and having a guide opening therein, and a stationary guide extending through said opening and located between said marker arm and rack bar.

In testimony whereof we affix our signatures in presence of two witnesses.

CHARLES A. JESKE.
CLARENCE P. JESKE.

Witnesses:
M. H. WEYKER,
McJ. DALEIDEN.